(No Model.)

L. J. ATWOOD & F. W. TOBEY.
ARGAND LAMP.

No. 411,517. Patented Sept. 24, 1889.

Witnesses:
J. Stail
Chas H. Smith

Inventors:
Lewis J. Atwood
Frederick W. Tobey
per Lemuel W. Serrell
Atty

UNITED STATES PATENT OFFICE.

LEWIS J. ATWOOD AND FREDERICK W. TOBEY, OF WATERBURY, CONNECTICUT, ASSIGNORS TO THE PLUME & ATWOOD MANUFACTURING COMPANY, OF SAME PLACE.

ARGAND LAMP.

SPECIFICATION forming part of Letters Patent No. 411,517, dated September 24, 1889.

Application filed March 8, 1888. Serial No. 266,542. (No model.)

*To all whom it may concern:*

Be it known that we, LEWIS J. ATWOOD and FREDERICK W. TOBEY, of Waterbury, in the county of New Haven and State of Connecticut, have invented an Improvement in Argand Lamps, of which the following is a specification.

Our present invention is especially adapted to hanging Argand lamps; and it relates to the combination, with the reservoir and wick-raising nut and screw, of a tube around the wick, a gear-wheel around the wick-tube and a collar around the wick-tube on the top of the reservoir, and a pinion to revolve the moving parts, and we use a peculiar air-distributer for the air-tube.

Figure 1:
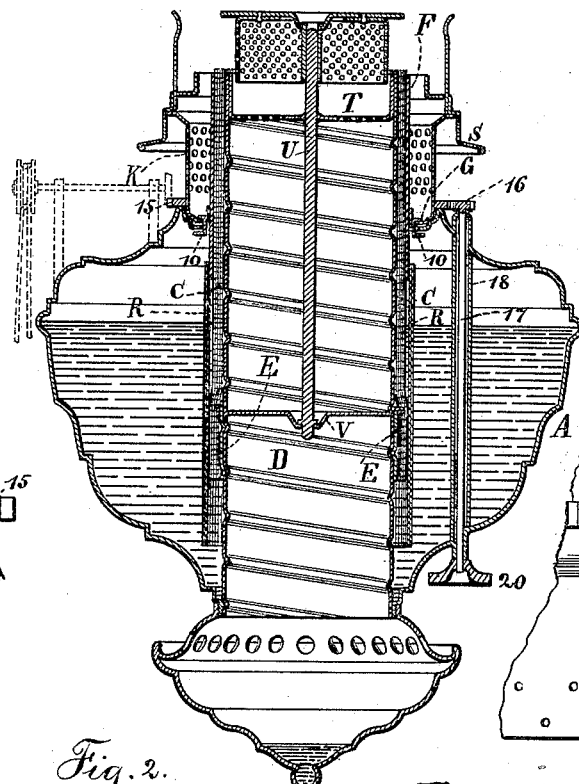
Figure 3:
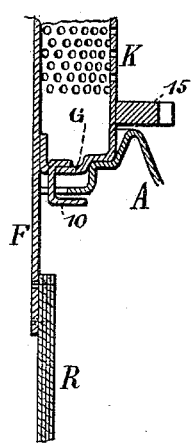
Figure 4:
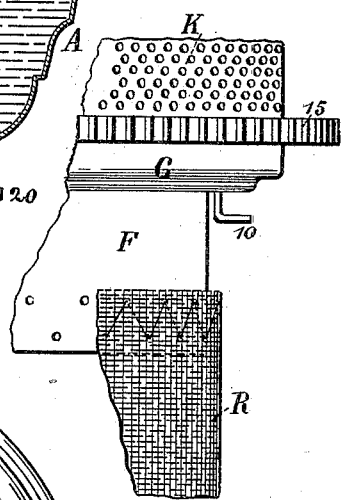
Figure 2:
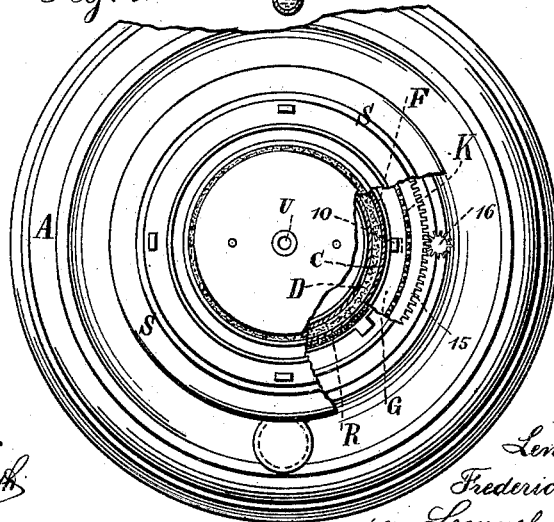

In the drawings, Figure 1 is a vertical section of the lamp fitted with our improvements, and Fig. 2 is a plan view, partially in section, to represent the pinion and gear-wheel. Fig. 3 is a section in larger size of the parts at the base of the air-distributer. Fig. 4 is a partial elevation of the wick-tube and gear-wheel.

The reservoir A is provided with a central air-tube D, having upon its exterior surface a screw-thread to act upon the wick-raising thimble E; and C represents the wick, and G is a collar resting upon the open-top end of the reservoir, and this collar is connected with the wick-tube F, that surrounds the wick C, and there is a connection of any suitable character between the wick-tube F and the wick-raising thimble E, so that when this wick-tube F is revolved the thimble and wick will also be revolved, and the thimble will raise or lower the wick as acted upon by a screw-thread upon the air-tube D. The air-distributer K is above the collar G, and there may be chimney-springs or other devices for holding the chimney above the air-distributer, and a deflecting-button above the upper end of the air-tube D or any desired flame-spreader applied to this point.

The upper end of the reservoir A is open and formed with an annular recess to receive the outer edge of the collar G, and it is also notched at this point for the passage of one or more projections or lugs 10 upon the collar G. These projections or lugs 10 are comparatively narrow, and the slot in the sheet metal of the reservoir for the passage of such lugs is also narrow, and these lugs are so placed that when the collar rests upon the upper part of the reservoir and it is partially rotated the lug or lugs 10 will pass through the openings or notches provided for them in the sheet metal of the reservoir, and, being below the edge thereof, the collar and the wick-tube therewith connected are held down in place upon the reservoir, so that the action of the device made use of for revolving the collar, wick-tube thimble, and wick will not cause the wick-tube and collar to be raised by the action of the screw in raising the thimble and the wick.

In practice it is found that the thimble or nut as raised by a screw upon the air-tube sometimes lifts the wick-tube and the collar. This is prevented by our improvement, because the locking projection 10 is below the sheet metal at the top edge of the reservoir.

The lower end of the wick-tube F extends below the collar G a sufficient distance to allow for a row of holes being made in the same, and the supplemental wick R is wrapped around the said wick-tube and sewed at its upper end to the same, and it hangs down nearly to the bottom of the reservoir and in contact with the outside of the wick, so as to draw up the oil and supply the wick after such oil is consumed below the lower end of the wick C.

Above the collar G, and in close proximity to and formed with the air-distributer, is a gear-wheel 15, into which the pinion 16 gears, and 17 is a shaft of the said pinion that is within the tube 18, that passes vertically, or nearly so, through the reservoir, and there is a thumb wheel or button 20 at the lower end of the shaft 17 by which the shaft 17 and pinion 16 can be rotated from below the lamp to act upon the gear-wheel 15 and revolve the wick-tube and the thimble for the wick and raise or lower such wick, according to the direction of rotation of the hand wheel or button 20.

The gear-wheel 15 may be formed by notching the lower edge of the air-distributer K; but it is usually preferable to make this gear-wheel separate and attach it around the air-distributer above the collar G, and it will be apparent that it is preferable to have the teeth of the pinion and the gear-wheel vertical, so that such teeth may separate one from the other when the wick-tube, air-distributer, and collar are lifted to give access to the reservoir.

If the pinion 16 is placed at the inner end of the horizontal shaft, as represented by dotted lines in Fig. 1, there may be a cord-wheel at the outer end of such shaft to be operated by a hanging endless cord that extends down into a position easily reached by an attendant for regulating the height of the flame.

In trimming and lighting the lamp it is sometimes inconvenient to reach the button. We therefore provide a hand wheel or flange S, projecting around the upper end of the air-distributer and below the chimney-holder, as seen in Fig. 1.

The air-tube contains the flat horizontal perforated air-distributer T, the edges of which are cylindrical and turned upwardly, so as to set within the air-tube and to nearly coincide with the upper edge of the air-tube and catch any carbonaceous particles that may fall when the wick is being trimmed after the removal of the foraminous skirt, and this air-distributer is fastened to the central rod U, so that the two can be removed together, and there is a conical step V for receiving the lower end of the rod U when the same is introduced within the air-tube D. The lower edge of the foraminous skirt is in proximity to the upper end of the air-tube, and the same may set within the upper edge of said air-tube or air-distributer to prevent the entrance of carbonaceous material from the wick while the lamp is burning.

What we claim as our invention—

1. The combination, in an Argand lamp, with the reservoir and thimble or nut and wick-raising screw, of a tube around the wick, a gear-wheel around the wick-tube, and a collar attached to the wick-tube and resting upon the top of the reservoir, and a pinion for acting upon such gear-wheel to revolve the wick-tube and wick-raising thimble or nut, substantially as set forth.

2. The combination, in an Argand lamp, with the reservoir, central air-tube having a screw-thread upon the same, and the wick-raising thimble or nut, of a wick-tube around the wick, a collar around the wick-tube, and a projection 10, passing in below the top edge of the reservoir for holding the wick-tube and collar down against the lifting action of the wick-raiser and wick, substantially as set forth.

3. The combination, in an Argand lamp, with the reservoir, the air-tube having a screw-thread thereon, and the wick-raising thimble or nut, of a wick-tube surrounding the wick, a collar at the upper end of the reservoir and connected to the wick-tube, a projection for holding down the collar against the lifting action of the wick-raiser, the gear-wheel around the wick-tube, and a pinion for rotating the same, and the wick-tube and wick-raiser, substantially as set forth.

4. The combination, with the Argand burner having a central air-tube and a foraminous skirt and flame-spreader, of a flat horizontal air-distributer having a cylindrical upturned rim made in one therewith and adapted to fit removably within the central air-tube and to receive carbonaceous material, and a rod passing through and attached to the flat air-distributer, the parts being removable from the air-tube, and a stationary step for the lower end of the rod, substantially as set forth.

Signed by us this 3d day of March, 1888.

LEWIS J. ATWOOD.
F. W. TOBEY.

Witness as to signature of L. J. Atwood:
GEO. T. PINCKNEY.
Witness as to signature of F. W. Tobey:
R. T. LATTIN.